(12) United States Patent
Tsukamoto et al.

(10) Patent No.: US 10,195,504 B2
(45) Date of Patent: Feb. 5, 2019

(54) BASEBALL OR SOFTBALL BAT WITH MODIFIED RESTITUTION CHARACTERISTICS

(71) Applicant: Mizuno USA, Inc., Norcross, GA (US)

(72) Inventors: Michiharu Tsukamoto, Osaka (JP); Yohei Yamashita, Osaka (JP); Toshiaki Kida, Osaka (JP); Kazuhiko Shindome, Hashima (JP)

(73) Assignee: MIZUNO CORPORATION, Osaka (JP)

( * ) Notice: Subject to any disclaimer, the term of this patent is extended or adjusted under 35 U.S.C. 154(b) by 0 days.

(21) Appl. No.: 14/324,108

(22) Filed: Jul. 4, 2014

(65) Prior Publication Data

US 2015/0005114 A1   Jan. 1, 2015

Related U.S. Application Data

(63) Continuation-in-part of application No. 13/345,004, filed on Jan. 6, 2012, now abandoned.
(Continued)

(51) Int. Cl.
*A63B 59/54* (2015.01)
*A63B 59/50* (2015.01)
(Continued)

(52) U.S. Cl.
CPC ............. *A63B 59/50* (2015.10); *A63B 60/10* (2015.10); *A63B 60/54* (2015.10); *A63B 59/54* (2015.10);
(Continued)

(58) Field of Classification Search
CPC .......... A63B 2102/18; A63B 2102/182; A63B 59/50–59/58; A63B 2059/581
(Continued)

(56) References Cited

U.S. PATENT DOCUMENTS 3,801,098 A   4/1974   Gildemeister
5,511,777 A   4/1996   Mcneely
(Continued)

FOREIGN PATENT DOCUMENTS

JP   2002126144   5/2002

OTHER PUBLICATIONS

International Search Report and Written Opinion dated May 1, 2012 for related PCT Patent Application No. PCT/US2012/020537.
(Continued)

*Primary Examiner* — Mark Graham
(74) *Attorney, Agent, or Firm* — Troutman Sanders LLP; Daniel Sharpe

(57) ABSTRACT

A softball or baseball bat with modified restitution characteristic is provided. The bat can comprise a substantially rigid core coupled with a single or multi-piece sleeve. The core can comprise a tip end, a barrel taper, a handle taper, and a handle. The sleeve can slide over the handle portion and can be pressed, molded, or adhered to the barrel taper. The resilient sleeve can be sized and shaped such that the sleeve portion is substantially the same diameter as the tip end. The sleeve can comprise a material capable of impact absorption. The sleeve can have a composite structure with inner and outer sleeve components. The sleeve can further comprise a cone to taper the sleeve in the handle taper portion of the bat. The material and thickness of the sleeve and the core can be varied to meet applicable restitution requirements.

20 Claims, 15 Drawing Sheets

Related U.S. Application Data

(60) Provisional application No. 61/430,367, filed on Jan. 6, 2011.

(51) Int. Cl.

| | | |
|---|---|---|
| *A63B 60/10* | (2015.01) | |
| *A63B 60/54* | (2015.01) | |
| B29C 45/14 | (2006.01) | |
| B29K 75/00 | (2006.01) | |
| B29K 705/02 | (2006.01) | |
| B29L 31/52 | (2006.01) | |
| B29C 65/48 | (2006.01) | |
| B29C 65/50 | (2006.01) | |
| B29C 65/56 | (2006.01) | |
| B29C 65/66 | (2006.01) | |
| B29C 65/00 | (2006.01) | |
| A63B 102/18 | (2015.01) | |

(52) U.S. Cl.
CPC ..... *A63B 2102/18* (2015.10); *A63B 2102/182* (2015.10); *A63B 2208/12* (2013.01); *A63B 2209/00* (2013.01); *A63B 2209/02* (2013.01); *A63B 2209/10* (2013.01); *B29C 45/14491* (2013.01); *B29C 65/48* (2013.01); *B29C 65/483* (2013.01); *B29C 65/5057* (2013.01); *B29C 65/565* (2013.01); *B29C 65/66* (2013.01); *B29C 66/5344* (2013.01); *B29C 66/71* (2013.01); *B29K 2075/00* (2013.01); *B29K 2705/02* (2013.01); *B29L 2031/52* (2013.01); *B29L 2031/5227* (2013.01)

(58) Field of Classification Search
USPC .................. 473/457, 519, 520, 564–568
See application file for complete search history.

(56) References Cited

U.S. PATENT DOCUMENTS

| | | | |
|---|---|---|---|
| 6,048,283 A | 4/2000 | Albarelli, Jr. | |
| 6,398,675 B1 * | 6/2002 | Eggiman | A63B 59/50 473/520 |
| 6,432,007 B1 | 8/2002 | Filice et al. | |
| 6,869,373 B1 | 3/2005 | Byrne et al. | |
| 6,872,156 B2 | 3/2005 | Ogawa et al. | |
| 7,014,580 B2 | 3/2006 | Forsythe et al. | |
| 7,033,291 B1 | 4/2006 | Meeker | |
| 7,128,670 B2 | 10/2006 | Sounders et al. | |
| 7,175,552 B2 * | 2/2007 | Fritzke | A63B 59/50 473/566 |
| 7,344,461 B2 * | 3/2008 | Van Nguyen | A63B 59/50 473/566 |
| 7,361,107 B2 | 4/2008 | Giannetti et al. | |
| 7,749,115 B1 | 7/2010 | Cruz et al. | |
| 7,985,149 B2 * | 7/2011 | Watari | A63B 59/50 473/566 |
| 8,602,924 B2 | 12/2013 | Shindome et al. | |
| 2003/0004020 A1 | 1/2003 | Ogawa et al. | |
| 2004/0053716 A1 | 3/2004 | Wu | |
| 2006/0258490 A1 | 11/2006 | Fitzgerald et al. | |
| 2007/0219027 A1 | 9/2007 | Chong | |
| 2008/0070726 A1 * | 3/2008 | Watari | A63B 59/50 473/566 |
| 2008/0234075 A1 | 9/2008 | Lancisi | |
| 2009/0143176 A1 | 6/2009 | Burger | |
| 2009/0215560 A1 | 8/2009 | McNamee et al. | |
| 2009/0264230 A1 | 10/2009 | Thouin | |
| 2009/0280934 A1 | 11/2009 | Watari et al. | |
| 2009/0280935 A1 | 11/2009 | Watari et al. | |
| 2011/0195808 A1 | 8/2011 | Chauvin | |
| 2011/0281674 A1 | 11/2011 | Shindome et al. | |
| 2012/0108371 A1 | 5/2012 | Epling et al. | |
| 2012/0142461 A1 | 6/2012 | Chuang et al. | |
| 2012/0178558 A1 | 7/2012 | Tsukamoto et al. | |

OTHER PUBLICATIONS

Final Office Action for U.S. Appl. No. 12/796,915 dated Apr. 5, 2012.

* cited by examiner

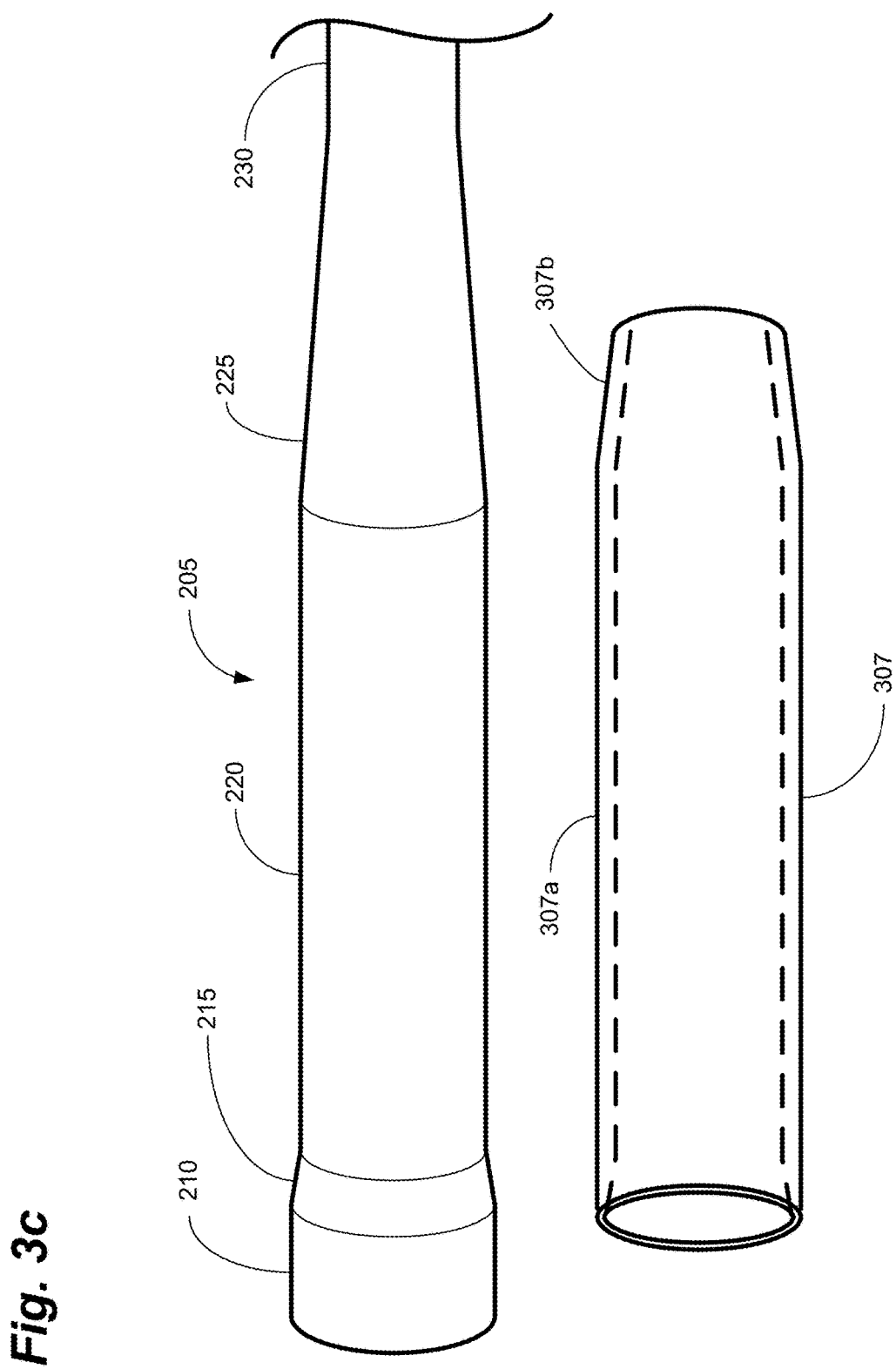

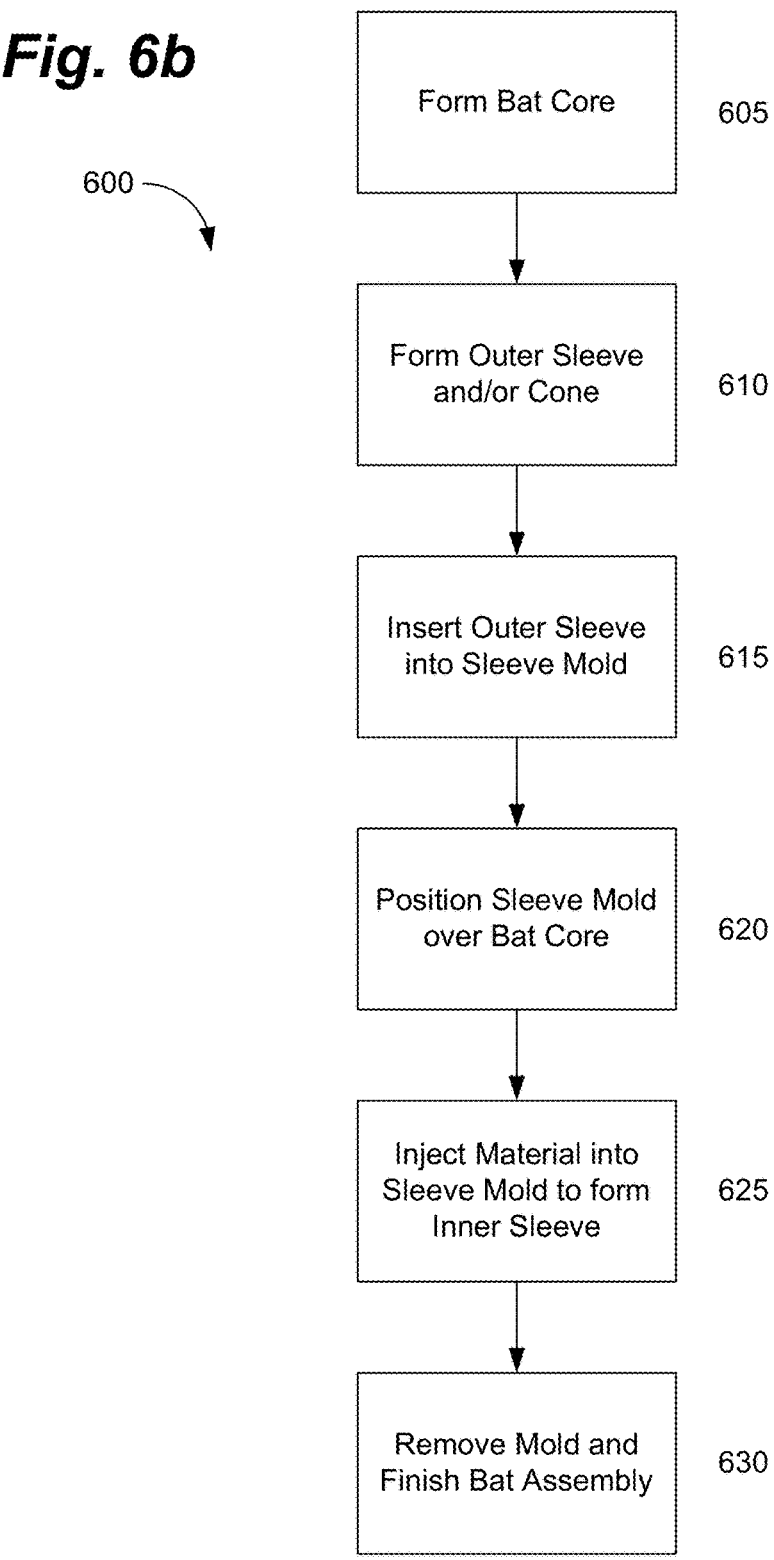

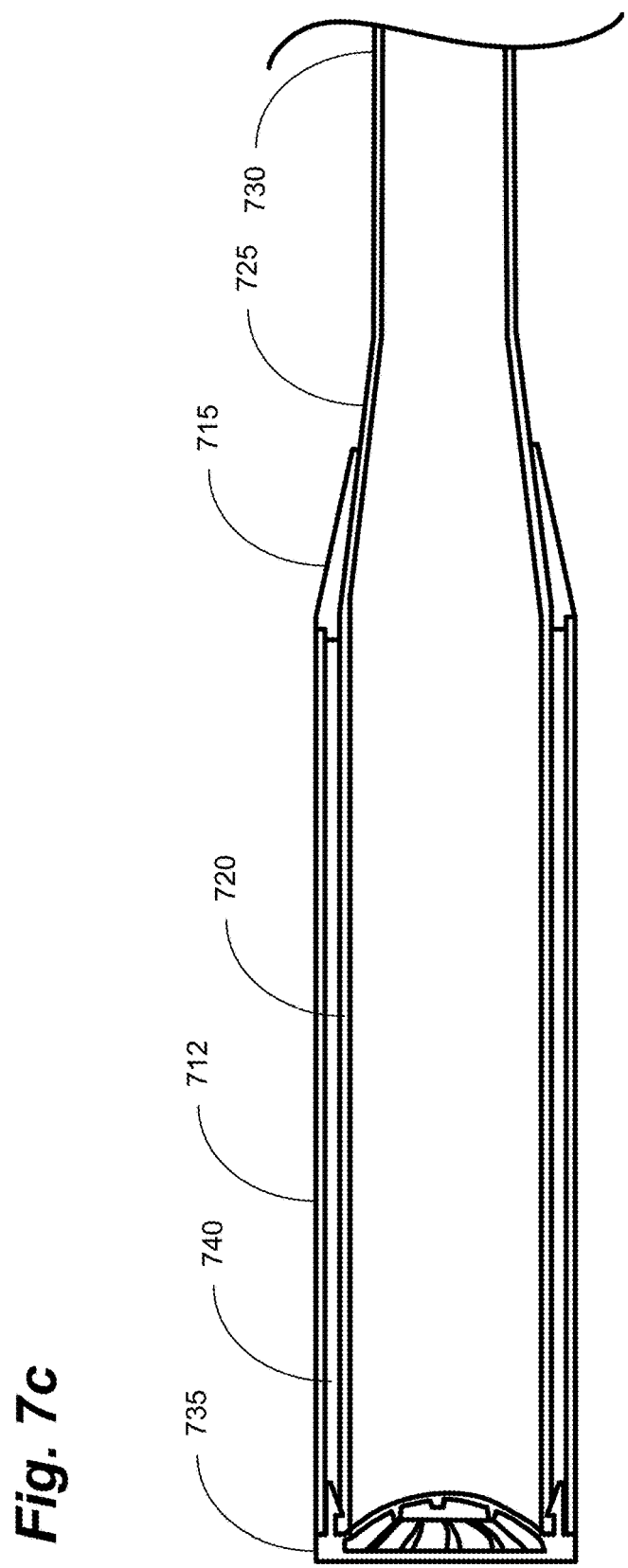

BASEBALL OR SOFTBALL BAT WITH MODIFIED RESTITUTION CHARACTERISTICS

CROSS-REFERENCE TO RELATED APPLICATIONS AND PRIORITY CLAIM

This application is a continuation-in-part of, and claims priority under 35 U.S.C. § 120 to, U.S. patent application Ser. No. 13/345,004, of the same title, filed Jan. 6, 2012, which claims the benefit, under 35 U.S.C. § 119(e), to U.S. Provisional Patent Application No. 61/430,367, filed Jan. 6, 2011, the entire contents and substance of both applications is incorporated herein by reference in its entirety as if fully set forth below.

BACKGROUND OF THE INVENTION

1. Field of the Invention

The present invention relates generally to bats for use in baseball and softball and specifically to bats with modified restitution characteristics to meet performance standards imposed by various sanctioning bodies.

2. Background of Related Art

Conventionally, bat manufacturers have endeavored to improve the performance of bats. In the case of a bat, improved performance can come in the form of, among other things, improved accuracy, reduced vibration, or increased coefficient of restitution. The latter, coefficient of restitution, relates to the power the bat imparts to the ball. In other words, the higher the coefficient of restitution of a bat, the faster the ball will rebound off the bat relative to the pitch speed.

Conventionally, bats were made out of hardwoods such as, for example, maple, birch, and ash. These woods provide good durability and reasonable cost of manufacture. In this case, however, the restitution characteristics of the bat are largely dictated (and limited) by the wood chosen. This limitation of the restitution, and thus power, of the bat, along with a certain amount of nostalgia, explains the use of wooden bats in Major League Baseball. It is thought that the extreme amount of energy major league players could impart to the ball, if armed with the more powerful aluminum or composite bats, would pose a danger to themselves, other players, and fans.

Until recently, the increased power provided by non-wooden bats was not thought to be an issue at lower levels, such as collegiate baseball and softball. As a result, aluminum and composite bats were used an unregulated in NCAA sports until approximately 1998. As a result, the materials and designs were chosen to maximize the restitution of the bat. In other words, the bats were designed to increase the velocity of the ball as it left the bat, or to be "hotter."

As shown in FIG. 1, an example of a bat design intended to maximize restitution is shown in U.S. Pat. No. 6,872,156 to Ogawa et al. This bat 100 comprises an aluminum core 105 with tapers 110a, 110b at both ends of the barrel. The tapered portion is then wrapped with a thermal polyurethane (TPU) sheet 115 to improve the restitution properties (i.e., the power) of the bat. Unfortunately, the double taper 110a, 110b of this bat proves to be difficult using conventional aluminum manufacturing techniques (i.e., this shape cannot be swaged or extruded). In addition, the dual taper 110a, 110b requires that the TPU sleeve 115 be molded or rolled onto the bat using hot forming techniques, producing a seam 120. As a result, it is difficult to maintain the density of the material 115 during application and the seam 120 presents a possible failure point that reduces durability.

After a marked increase in hitting statistics and player injuries, however, in 1998 the NCAA began to look into regulating the bats. Initially, the bats were regulated based on the return speed of a pitch based on the swing speed of the bat. This measurement was later found to be insufficient because, unlike solid wooden bats, the balance point of hollow non-wooden bats can be manipulated to increase swing speed. The closer the balance point of the bat is to the handle, for example, the faster a player can swing the bat, which is directly related to the ball speed coming off the bat.

Since 1998, continual refinement of the NCAA standard has resulted in a rule that governs many physical aspects of bats for use in NCAA sports. The size and weight of the bat is regulated, for example, along with the moment of inertia and the Baseball Coefficient of Restitution (BBCOR). Bats must be tested in NCAA laboratories for initial certification and may be subjected to random field-testing. The latter to ensure that certain bats, such as composite bats (that tend to get "hotter" with use), remain within guidelines. Other domestic and foreign sanctioning bodies have, or are in the process of, imposing similar performance standards.

What is needed, therefore, is a bat designed, not to maximize absolute performance, but to maximize performance within a given set of guidelines. The bat should be tunable to meet different standards and inexpensive to manufacture. It is to such a bat that embodiments of the present invention are primarily directed.

SUMMARY OF THE INVENTION

Embodiments of the present invention relate to a baseball or softball bat core with an exterior resilient sleeve. The bat core can comprise a variety of materials including, but not limited to, aluminum, fiberglass, and carbon fiber. In some embodiments, the bat core can comprise a tapered, stepless barrel with no discontinuities along the length of the barrel. The resilient sleeve can be placed onto the bat core from the handle end or the tip end and can be affixed to the barrel by injecting a material therebetween to form an inner sleeve. In this manner, no steps or shoulders are required on the barrel.

In some embodiments, the sleeve can comprise a one-piece sleeve of resilient material. In other embodiments, the sleeve can comprise a multi-layer sleeve. The material can be, for example and not limitation, thermal polyurethane, nylon, or fiberglass reinforced plastic. The thickness and restitution characteristics of the sleeve can be varied to meet various bat restitution protocols and/or to meet other requirements while maintaining the same bat core. In other embodiments, characteristics of the bat core can be varied to achieve the same end.

Embodiments of the present invention can comprise a batting system for baseball or softball, which can comprise a substantially rigid shell with a tip portion, a barrel portion, a handle taper, and a handle portion. In general, the barrel portion and the handle portion can be substantially cylindrical in shape, with the handle taper connecting the barrel portion and the handle portion. The system can further comprise an exterior sleeve assembly. The sleeve assembly can be disposed in an overlying manner to the barrel portion, with a first end proximate the tip portion and a second end proximate the handle taper.

In some embodiments, the exterior sleeve assembly can comprise a substantially cylindrical sleeve portion disposed proximate the barrel portion and a conical portion disposed proximate the handle taper. In some embodiments, the exterior diameter of the cylindrical sleeve portion can taper from a first end proximate the tip portion to a second end proximate the conical portion. To provide a transition between the tip of the barrel and the barrel, in some embodiments, the barrel can further comprise a barrel taper. To this end, the interior portion of the first end of the exterior sleeve assembly can be tapered to substantially the same shape as the barrel taper.

In other embodiments, the barrel portion can comprise a step, instead of a taper, disposed between the tip portion and the barrel portion. In this configuration, the first end of the exterior sleeve assembly can be substantially cylindrical (as opposed to tapered) where it abuts the step. In some embodiments, the exterior sleeve assembly can be press fit onto the barrel portion. In a preferred embodiment, the outer shell of the sleeve assembly can comprise thermoplastic polyurethane ("TPU") and the inner shell of the sleeve assembly can comprise polyurethane ("PU"). In some embodiments, the exterior sleeve assembly can be molded onto the barrel portion. In a preferred embodiment, the substantially rigid shell can be manufactured from an aluminum alloy. In still other embodiments, the barrel can be of a stepless design with no steps or tapers (other than the handle taper).

Embodiments of the present invention can also comprise a method of manufacturing a baseball or softball bat. The method can comprise, for example, forming a core comprising a tip portion, a barrel portion, a handle taper, and a handle portion, the barrel portion and the handle portion being substantially cylindrical in shape, the handle taper connecting the barrel portion and the handle portion, forming an exterior sleeve assembly, and pressing the exterior sleeve assembly over the core such that a first end of the exterior sleeve assembly is proximate the tip portion and a second end of the exterior sleeve assembly is proximate the handle taper.

In some embodiments, the exterior sleeve assembly can be press fit onto the core without using an adhesive. In other embodiments, the exterior sleeve assembly can be adhered to the core using an adhesive. In a preferred embodiment, the adhesive is a glue sheet. In some embodiments, the exterior sleeve assembly can comprise a substantially cylindrical sleeve portion disposed proximate the barrel portion and a conical portion disposed proximate the handle taper.

Additional embodiments of the present invention can comprise a method of manufacturing a baseball or softball bat with a molded sleeve. As before, the method can comprise forming a core comprising a tip portion, a barrel portion, a handle taper, and a handle portion, the barrel portion and the handle portion being substantially cylindrical in shape, the handle taper connecting the barrel portion and the handle portion. The method can further comprise forming an exterior sleeve, inserting the exterior sleeve into a sleeve mold, positioning the sleeve mold over the core such that the exterior sleeve is positioned concentrically around the barrel portion such that there is a gap therebetween, and injecting material between the exterior sleeve and the barrel portion to form an interior sleeve. In this manner, the exterior sleeve and the interior sleeve can comprise a composite sleeve assembly with a first end disposed proximate the tip portion and a second end proximate the handle taper.

In a preferred embodiment, the exterior sleeve can comprise TPU and the interior sleeve comprises PU. In this manner, when the interior sleeve is injected into the mold, it can affix or adhere the exterior sleeve to the barrel portion. In some embodiments, the method can further comprise inserting a conical portion disposed proximate the second end of the composite sleeve assembly (i.e., near the handle taper) to provide a smooth transition between the composite sleeve assembly and the handle taper. In other embodiments, the conical portion can be formed integrally with the exterior sleeve, or can be molded as part of the interior sleeve during the molding process. In a preferred embodiment, the exterior of the composite sleeve assembly is tapered from the first end to the second end.

Embodiments of the present invention can also comprise a batting system for baseball or softball comprising a substantially stepless, rigid shell comprising a tip portion, a barrel portion, a handle taper, and a handle portion, the barrel portion and the handle portion being substantially cylindrical in shape, the handle taper connecting the barrel portion and the handle portion, an exterior sleeve assembly, disposed in an overlying manner to the barrel portion, with a first end proximate the tip portion and a second end proximate the handle taper, and an interior sleeve assembly disposed between the rigid shell and the exterior sleeve assembly. In some embodiments, the exterior sleeve assembly can comprise a substantially cylindrical sleeve portion disposed proximate the barrel portion and a conical portion disposed proximate the handle taper.

In some embodiments, the thickness of the rigid shell can increase from a first end proximate the tip portion to a second end proximate the conical portion. In other embodiments, thickness of the rigid shell decreases from a first end proximate the tip portion to a second end proximate the conical portion. The inner sleeve can comprise an injectable material injected between the rigid shell and the exterior sleeve. In other embodiments, the exterior sleeve assembly can be press fit onto the barrel portion. In some embodiments, the exterior sleeve can comprise thermoplastic polyurethane ("TPU") and the interior sleeve can comprise polyurethane ("PU"). The thickness of the exterior sleeve can be between approximately 0.2 mm and 1.0 mm, while the thickness of the interior sleeve can be between approximately 6 mm and 10 mm. In a preferred embodiment, the thickness of the exterior sleeve is approximately 0.3 mm and the thickness of the interior sleeve is approximately 8 mm.

Embodiments of the present invention can also comprise a method of manufacturing a baseball or softball bat comprising forming a substantially stepless, rigid core comprising a tip portion, a barrel portion, a handle taper, and a handle portion, the barrel portion and the handle portion being substantially cylindrical in shape, the handle taper connecting the barrel portion and the handle portion, forming an exterior sleeve, positioning the exterior sleeve coaxially over the substantially stepless, rigid core; and injecting an injectable material in between the exterior sleeve and the substantially stepless, rigid core to form an inner sleeve. In some embodiments, the interior sleeve adheres the exterior sleeve to the substantially stepless, rigid core.

In some embodiments, the method can further comprise inserting a cap into the substantially stepless, rigid core proximate the tip portion. In some embodiments, the cap can be adhered to the substantially stepless, rigid core by the inner sleeve. The method can further comprise inserting a cone proximate the taper portion of the substantially stepless, rigid core to taper the sleeve proximate the handle portion of the bat. In other embodiments, the cone can be adhered to the substantially stepless, rigid core by the inner sleeve.

Embodiments of the present invention can also comprise a method of manufacturing a baseball or softball bat comprising forming a substantially stepless, rigid core comprising a tip portion, a barrel portion, a handle taper, and a handle portion, the barrel portion and the handle portion being substantially cylindrical in shape, the handle taper connecting the barrel portion and the handle portion, forming an exterior sleeve, inserting the exterior sleeve into a sleeve mold, positioning the sleeve mold over the substantially stepless, rigid core such that the exterior sleeve is positioned concentrically around the barrel portion such that there is a gap therebetween, and injecting material between the exterior sleeve and the barrel portion to form an interior sleeve.

In some embodiments, the exterior sleeve can comprise TPU, the interior sleeve can comprises PU, and the interior sleeve can adhere the exterior sleeve to the barrel portion. In some embodiments, the method can further comprise inserting a conical portion disposed proximate the handle taper of the substantially stepless, rigid core to provide a smooth transition between the composite sleeve assembly and the handle taper.

These and other objects, features and advantages of the present invention will become more apparent upon reading the following specification in conjunction with the accompanying drawing figures.

BRIEF DESCRIPTION OF THE FIGURES

FIG. 3c depicts a one-piece sleeve and the tapered bat core of FIG. 2a, in accordance with some embodiments of the present invention.

FIG. 6b is a flowchart for a method of molding a composite sleeve onto a bat, in accordance with some embodiments of the present invention.

FIG. 7c depicts a cross-sectional view of the assembled hybrid bat body with a two-piece sleeve and cap of FIG. 7b, in accordance with some embodiments of the present invention.

DETAILED DESCRIPTION OF THE INVENTION

Embodiments of the present invention relate to a baseball or softball bat, and more specifically a baseball or softball bat assembly comprising a substantially rigid core with an outer sleeve. In some embodiments, the core can comprise a substantially rigid material such as, for example, aluminum, fiberglass, or carbon fiber. The core can have a tip portion, a barrel taper, a barrel portion, and a handle taper. In some embodiments, the barrel taper can further comprise a lip or step.

The bat assembly can further comprise an exterior sleeve. The sleeve can comprise, for example, TPU, nylon, carbon fiber, or fiberglass. In some embodiments, the sleeve can be sized and shaped to be pressed, molded, or adhered to the barrel taper and barrel portion. The lip on the barrel taper can be, for example, a shoulder formed on the barrel portion to locate the sleeve. The materials, dimensions, and thicknesses, among other factors, of the sleeve and the core, can be manipulated to change the characteristics of the bat (e.g., BBCOR).

The materials described hereinafter as making up the various elements of the present invention are intended to be illustrative and not restrictive. Many suitable materials that would perform the same or a similar function as the materials described herein are intended to be embraced within the scope of the invention. Such other materials not described herein can include, but are not limited to, materials that are developed after the time of the development of the invention.

To simplify and clarify explanation, embodiments of the present invention are described below as a bat with an aluminum core or shell and a resilient, external TPU sleeve. Those skilled in the art will recognize, however, that the invention is not so limited. The shell of the bat, for example, can comprise other suitable materials such as, for example and not limitation, fiberglass, carbon fiber, or Kevlar®. Similarly, the sleeve could comprise, for example and not limitation, TPU, carbon fiber, or fiberglass.

Figure 1:
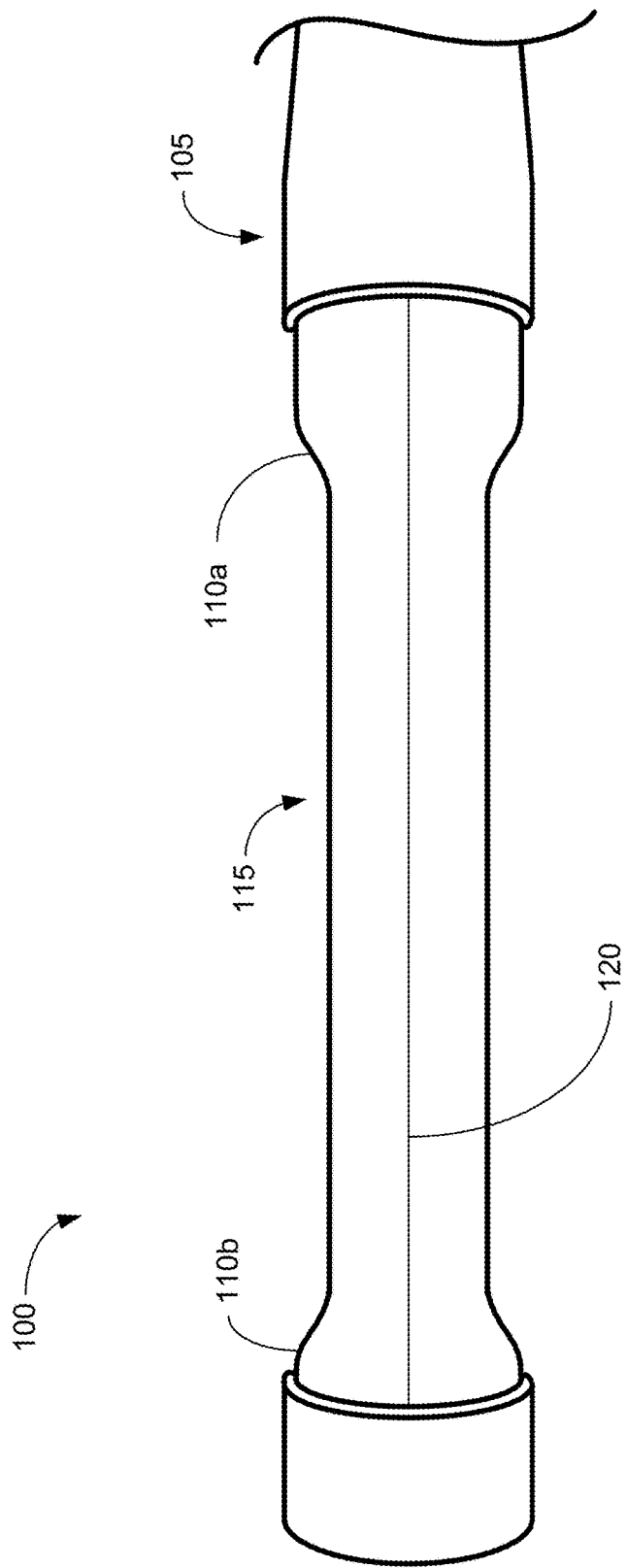
FIG. 1 depicts a prior art hybrid bat with dual flanges.

As described above, a problem with conventional hybrid bats is that they are difficult to manufacture. As shown in FIG. 1, conventional hybrid bats comprise a double barrel taper. He double barrel taper requires special forming processes and precludes the ability to use conventional metal forging and/or extruding techniques. In addition, the double taper requires that the sleeve component be seam welded or heat formed to the barrel. This is because the shape of the barrel prevents the sleeve from simply being pressed onto the barrel from one end or the other. In addition, previous bat designs have sought only to increase the power of the bat. The notion of creating ever "hotter" bats, however, is now at odds with rules imposed by a variety of sanctioning bodies.

What is needed therefore is a bat that provides superior ease of manufacture with adjustable performance characteristics. It is to such a bat that embodiments of the present invention are primarily directed.

Figure 2A:
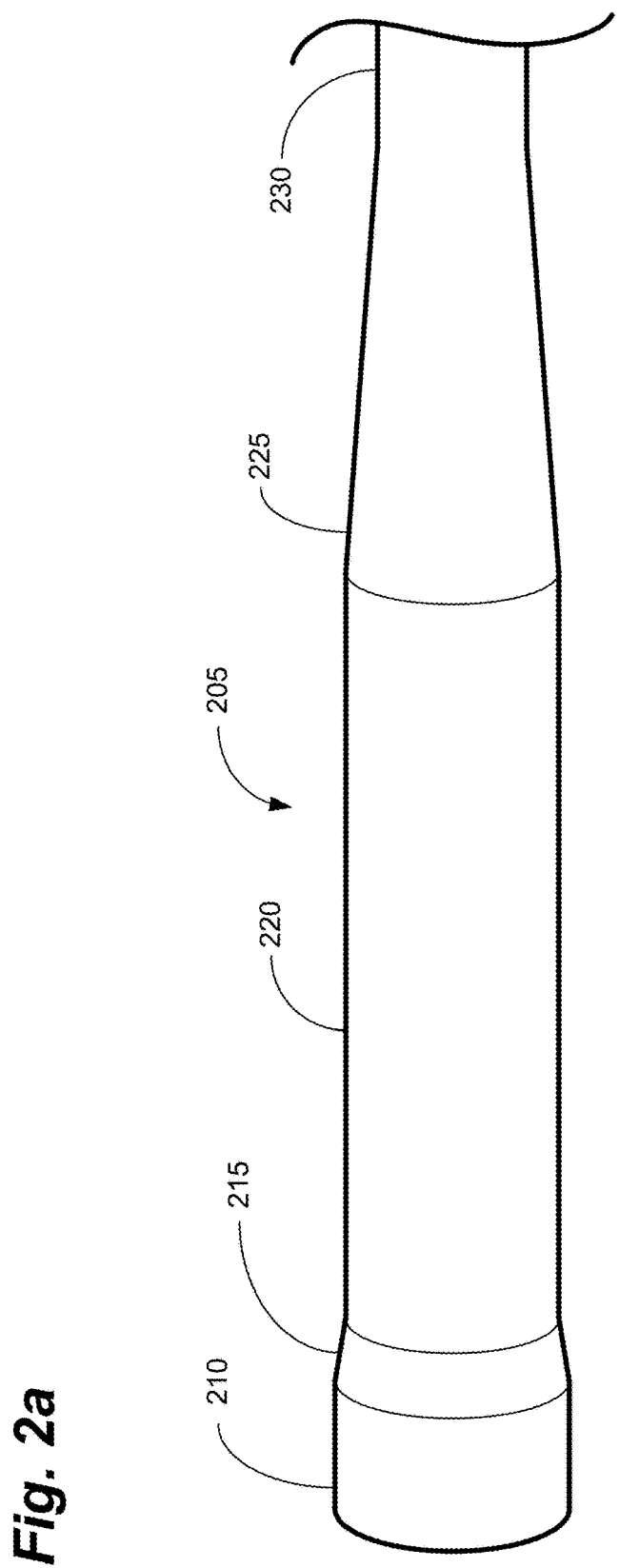
FIG. 2a depicts a bat core with a barrel taper, in accordance with some embodiments of the present invention.

As shown in FIG. 2a, embodiments of the present invention can comprise a batting system 200 comprising a rigid core 205. In a preferred embodiment, the core 205 can comprise aluminum, but other suitable materials such as, for example and not limitation, carbon fiber, fiberglass, and metal/plastic composites are contemplated. The core 205 can be formed using many suitable methods, including but not limited to, forging, CNC machining, blow-molding, and extrusion. The core 205 can comprise a tip portion 210, a barrel taper 215, a barrel portion 220, a handle taper 225, and a handle 230. As shown, in some embodiments, the tip portion 210 can comprise the portion of the bat 200 with the largest diameter. The tip portion 210 can also comprise a shoulder, or barrel taper 215, where the tip portion 210 transitions to the barrel portion 220. The barrel taper 215 can act as a stop for the resilient sleeve, discussed below.

Figure 2B:
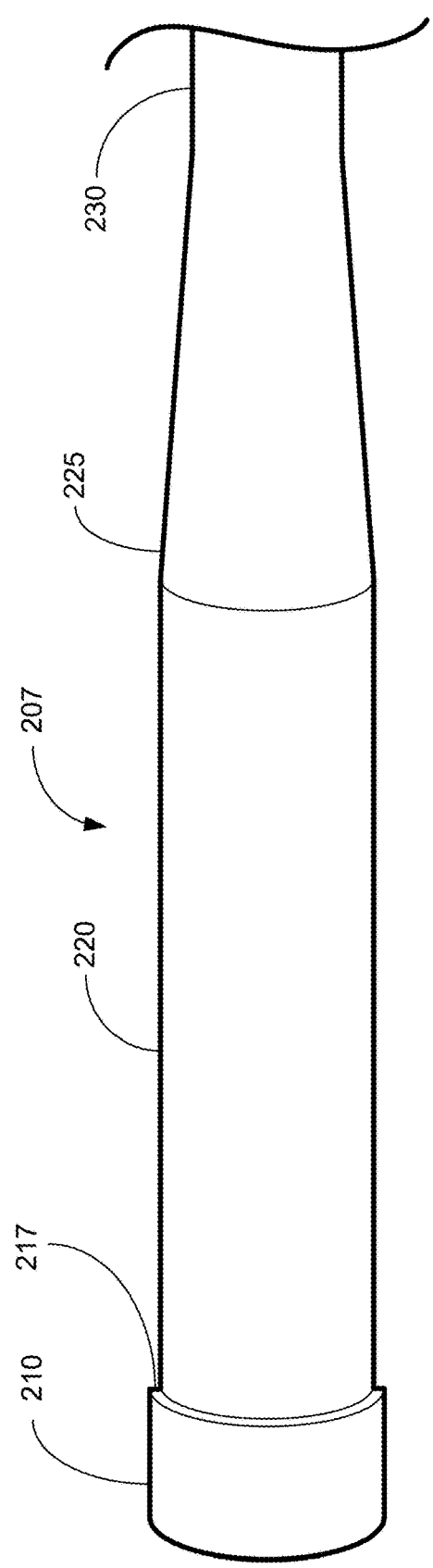
FIG. 2b depicts a bat core with a barrel step, in accordance with some embodiments of the present invention.

The core 205 can further comprise a barrel portion 220. The barrel taper 215 can transition between the larger diameter tip portion 210 and the smaller diameter barrel 220. In some embodiments, as shown in FIG. 2b, the core 207 may simply have a step 217 between the tip portion 210 and the barrel portion 220, precluding the need for the barrel taper 215. In a preferred embodiment, the barrel 220 can have substantially the same diameter from the end of the barrel taper 215, or step 217, to the beginning of the handle taper 225. The core 207 can further comprise a handle taper 225 and a handle 230. In some embodiments, the handle can comprise a knob located at the end of the handle 230 to prevent the bat from slipping out of the user's hand.

Figure 3A:
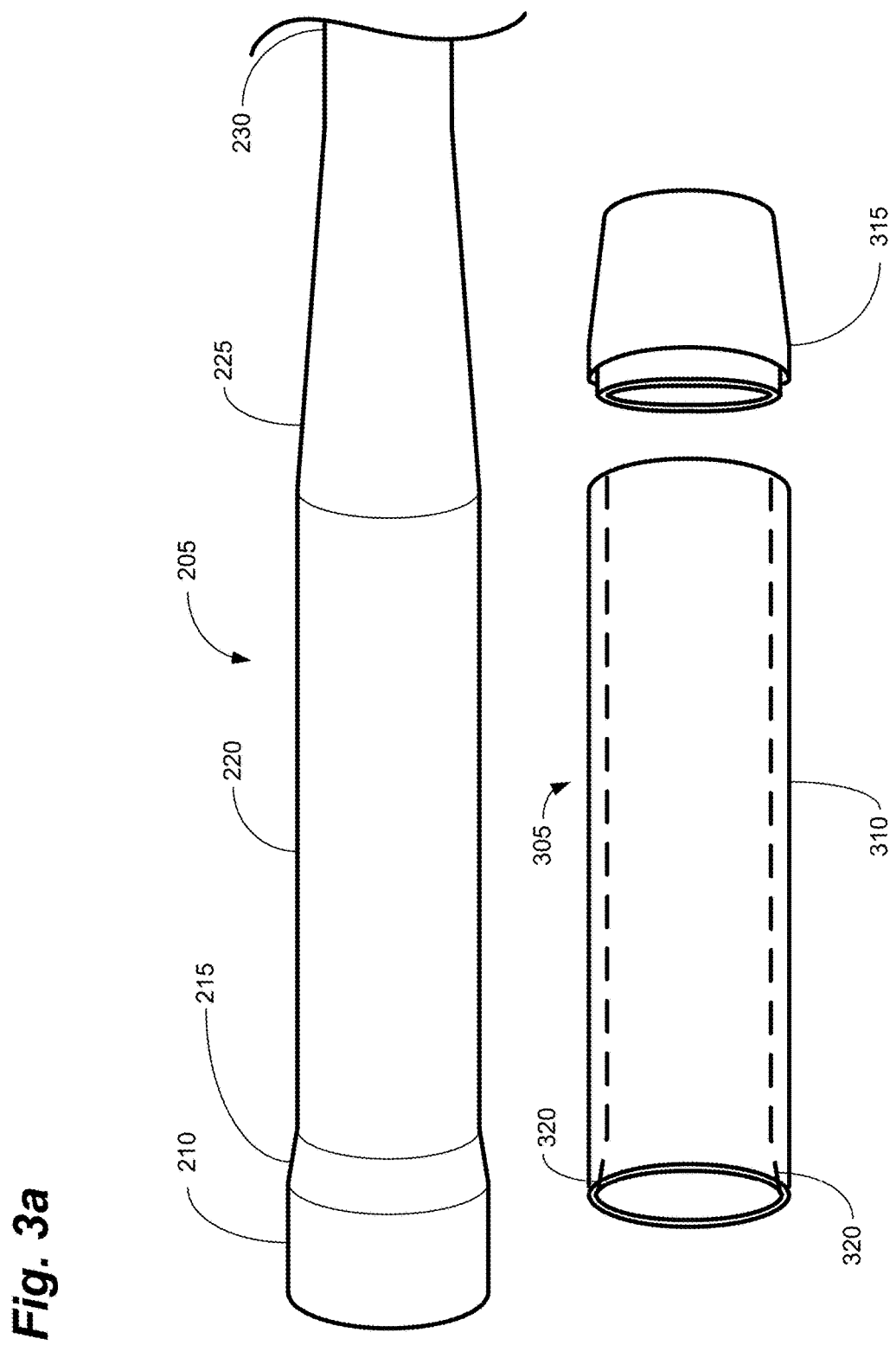
FIG. 3a depicts a two-piece sleeve and the tapered bat core of FIG. 2a, in accordance with some embodiments of the present invention.
Figure 3B:
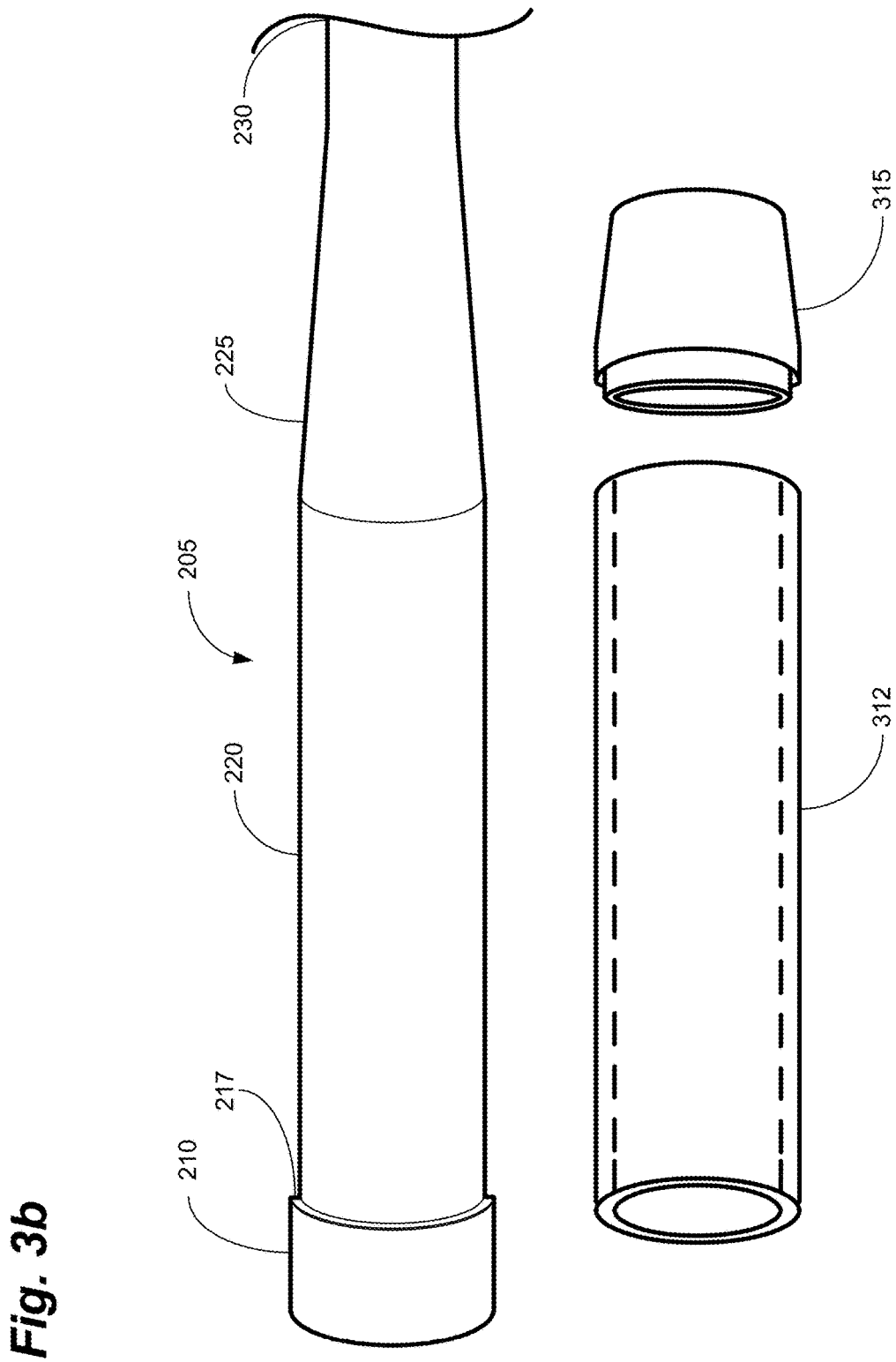
FIG. 3b depicts a two-piece sleeve and the stepped bat core of FIG. 2b, in accordance with some embodiments of the present invention.

As shown in FIG. 3, the bat assembly 200 can further comprise an exterior sleeve assembly 305. In some embodiments, as shown, the sleeve assembly 305 can comprise a sleeve portion 310 and a tapered portion, or cone 315. The inside diameter of the sleeve 310 can be substantially the same as the outside diameter of the barrel 220. The outside diameter of the sleeve 310 can be tapered such that it is substantially the same diameter as the tip portion 210 on a first end, but tapers in the direction of the handle taper 225.

In some embodiments, the sleeve 310 can comprise a single or multi-layer composite material. The sleeve can comprise, for example, and not limitation, TPU, PU, carbon fiber, fiberglass, or combinations thereof. In a preferred embodiment, the sleeve comprises a TPU outer layer with a PU core. The TPU outer layer can be approximately 0.1-0.5 mm thick, while the PU inner layer can be approximately 4-10 mm thick. In a preferred embodiment, the TPU layer is approximately 0.3 mm, while the PU layer tapers from approximately 8 mm proximate the tip portion 210 to approximately 6 mm proximate the handle taper 225.

Of course, other sleeve combinations could be used that included more or less layers or different components to produce different bat characteristics. The sleeve 310 could comprise, for example, one or more layers of TPU, PU, carbon fiber, or fiberglass. In some embodiments, the layers of the sleeve could also be separated by one or more separation layers (i.e., layers intended to reduce the friction between layers of the sleeve 310). The separation layer could be, for example and not limitation, polypropylene to enable the multiple layers of the sleeve 310 to deform independently.

In some embodiments, the inner diameter of the sleeve 310, shown in dashed lines, can comprise a taper 320 that substantially coincides with the barrel taper 215. In this manner, the sleeve 310 can be press fit onto the core 205. The barrel taper 215 can also act as a stop to ensure retention and proper location of the sleeve 310 on the core 205. In other embodiments, the core 205 can comprise a step 217, or shoulder, to locate a substantially cylindrical sleeve 312. See, FIG. 3b. In either configuration, an adhesive such as, for example and not limitation, epoxy or a glue sheet can also be used to secure the sleeve 310 to the barrel 220.

In some embodiments, the sleeve assembly 305 can further comprise a cone 315. The cone 315 can be tapered to substantially conform to the handle taper 225 of the bat assembly 200. In this configuration, the cone 315 can create a smooth transition from the end of the sleeve 310 to the handle portion 230, which can prevent mishits and damage caused by hits made on the handle taper 225 or close to the handle 230 (e.g., when a pitcher "jams" the batter).

The multi-piece sleeve assembly 305 enables the sleeve 310 and cone 315 to be replaced separately. This can enable the bat to be tuned by changing, for example, the weight, shape, size, or material of the sleeve 310 and/or cone 315. This can also enable the sleeve 310 and cone 315 to be replaced independently, as necessary, for maintenance purposes (e.g., one or the other cracks during use). This can reduce maintenance costs and increase the useful life of the bat system 200.

In other embodiments, as shown in FIG. 3c, due to the shape of the core 205, the sleeve 310 and cone 315 can comprise a one-piece sleeve assembly 307, which can be installed on the barrel 220 from the handle end 230. In other words, unlike prior art bats, because both tapers 215, 225 on the core 205 reduce in the same direction (i.e., they both get smaller towards the handle), a one-piece sleeve assembly 307 with integral sleeve 307a and cone 307b can be pressed-fit or adhered to the core 205 from the handle end. This configuration can reduce manufacturing costs and increase durability, though it provides a slight reduction in tuneability and serviceability.

In some embodiments, the sleeve 310, 312 and cone 315 can be adhered or press fit to the core 205. The sleeve 310, 312 and cone 315 can comprise, for example and not limitation, nylon, fiberglass, carbon fiber, Kevlar® or combinations thereof. In some embodiments, the sleeve 310, 312 and cone 315 can comprise TPU. In a preferred embodiment, the sleeve 310, 312 and cone 315 can comprise an outer shell of TPU and an inner shell of PU.

In some embodiments, the sleeve 310, 312 can be pressed onto the core 205 from the handle 230 end until it is firmly seated against the taper 215 or shoulder 217 of the core 205. In some embodiments, the sleeve 310, 312 and/or cone 315 can be press fit onto the core 205, obviating the need for adhesives. In other embodiments, the sleeve 310, 312 and/or cone 315 can be adhered to the core 205 using, for example and not limitation, epoxy, glue sheets, or heat shrinking.

In still other embodiments, the sleeve 310 and/or cone 315 can be molded around the core 205. A mold can be placed around the barrel 220 of the core 205, for example, such that the bottom of the mold is substantially aligned with the taper 215 or shoulder 217 proximate the tip portion 210. A suitable material such as, for example and not limitation, liquid (i.e., molten) polyurethane ("PU") can be placed into the mold. The PU can be, for example and not limitation, poured or injected into the mold (e.g., using injection molding techniques). In this configuration, the sleeve 310, 312 can be molded and adhered to the core 205 in a single process.

In yet another embodiment, a mold can be placed around the barrel 220 of the core 205, for example, such that the bottom of the mold is substantially aligned with the taper 215 or shoulder 217 proximate the tip portion 210. Prior to injection molding, a TPU sheet can be formed and placed inside the mold to form the outer layer of the sleeve. A suitable material such as, for example and not limitation, liquid (i.e., molten) polyurethane ("PU") can then be placed into the mold between the core 205 and the TPU sheet. The PU can be, for example and not limitation, poured or injected into the mold (e.g., using injection molding techniques). This can enable a multi-layered sleeve 310, 312 to be molded and adhered to the core 205 in a single process. In this configuration, the TPU outer layer can be approximately 0.1-0.5 mm thick, while the PU inner layer can be approximately 4-10 mm thick. In a preferred embodiment, the TPU layer can be approximately 0.3 mm, while the PU layer can taper from approximately 8 mm proximate the tip portion 210 to approximately 6 mm proximate the handle taper 225.

The density and/or hardness of the sleeve 310, 312 can be varied to reduce the BBCOR of the system 200 to absorb various amounts of energy to meet various regulatory standards. This can enable, for example, a single bat design to meet differing power standards by simply changing the sleeve 310, 312 and/or cone 315. In other embodiments, the thickness and/or composition of the sleeve 310, 312 can be varied to increase or decrease the amount of energy absorbed by the sleeve 310, 312. In some embodiments, the core 205, sleeve 310, 312, and cone 315 can be sold separately to enable a user to participate in multiple series offered by multiple sanctioning bodies using a single system 200. The user can, for example, buy one core 205 and then use interchangeable sleeve 310, 312/cone 315 combinations to play in multiple leagues.

In some embodiments, the configuration of the core 205, sleeve 310, 312, and cone 315 can be manipulated to meet the applicable standard. Many sanctioning bodies regulate not only the BBCOR, but, for example and not limitation, the balance point of the bat assembly 200. Because the sleeve 310, 312 may comprise only a small portion of the overall mass of the bat assembly 200, it may be necessary to modify the dimensions of the core 205 to produce the necessary geometry. In some embodiments, therefore, the core 205 and/or the sleeve 310, 312 and cone 315 can be varied to produce the desired result. The configuration of the core 205, sleeve 310, 312, and cone 315 can also be varied, among other things, due to performance requirements in baseball vs. softball, women's vs. men's sports, etc.

TABLE 1

| 31-32 Inch Bat | | |
| --- | --- | --- |
| MEASUREMENT POSITION (in) | DIAMETER (in) | WALL THICKNESS (in) |
| 1 | 2.58 | 0.102 |
| 4 | 1.98 | 0.110 |
| 6 | 1.98 | 0.110 |
| 9 | 1.98 | 0.100 |
| 11 | 1.62 | 0.092 |
| 14 | 1.14 | 0.086 |
| 16 | 0.92 | 0.090 |
| 19 | 0.88 | 0.094 |
| 21.5 | 0.88 | 0.094 |
| 24 | 0.87 | 0.094 |
| 26.5 | 0.87 | 0.094 |
| 30 | 0.87 | 0.094 |

TABLE 2

| 33-34 Inch Bat | | |
| --- | --- | --- |
| T POSITION (in) | OUTER DIAMETER (in) | THICKNESS (in) |
| 1 | 2.58 | 0.102 |
| 5 | 1.98 | 0.110 |
| 7 | 1.98 | 0.110 |
| 10 | 1.98 | 0.100 |

TABLE 2-continued

| 33-34 Inch Bat | | |
| --- | --- | --- |
| T POSITION (in) | OUTER DIAMETER (in) | THICKNESS (in) |
| 12 | 1.62 | 0.092 |
| 15 | 1.14 | 0.086 |
| 17 | 0.92 | 0.090 |
| 20 | 0.88 | 0.094 |
| 22.5 | 0.88 | 0.094 |
| 25 | 0.87 | 0.094 |
| 27.5 | 0.87 | 0.094 |
| 30 | 0.87 | 0.094 |

As shown in Table 1 and 2, above, the dimensions of the core can vary based on, for example, the length of the bat and the intended user (e.g., men, women, or children), among other things. The amount of energy absorbed by the bat can also be varied widely based on the material used for the sleeve. The amount of energy absorbed can be measured using the coefficient of restitution ("COR"). COR, in this case, represents the speed of the ball as it leaves the bat divided by the speed of the ball as it approaches the bat without swinging the bat (i.e., its rebound speed). A COR smaller than one, for example, indicates that a portion of the kinetic energy of the ball is absorbed when it contacts the bat.

Similarly, the energy absorption coefficient (E-abs) can be calculated by dropping a weight on a test piece to obtain a stress-strain curve. In this example, a 20 mm test piece is used and is impacted with a 10 Kg weight from a height of 60 mm. The stress-strain curve can be measured using methods known in the art (e.g., strain gauges). This information can be used to calculate E-abs using equation 1, below:

$$W = \sum_{A=1}^{3} \sum_{i=1}^{n} 2\frac{\mu_i}{\alpha_i}(\lambda_A^{-1} - 1) + \frac{K}{2}(J - 12)0^2 \qquad (1)$$

TABLE 3

| Insert Properties | | |
| --- | --- | --- |
| Sample | E-abs | COR |
| 1 | 75.8 | 0.492 |
| 2 | 76.6 | 0.448 |
| 3 | 77.6 | 0.494 |
| 4 | 78.9 | 0.491 |
| 5 | 79.1 | 0.483 |
| 6 | 76 | 0.487 |
| 7 | 58 | 0.537 |
| 8 | 56 | 0.528 |
| 9 | 80 | 0.466 |
| 10 | 71 | 0.522 |
| 11 | 66.5 | 0.508 |
| 12 | 72.6 | 0.505 |
| 13 | 43.7 | 0.577 |
| 14 | 39.8 | 0.581 |
| 15 | 43.4 | 0.57 |
| 16 | 43.6 | 0.574 |
| 17 | 72.8 | 0.503 |

Figure 4:
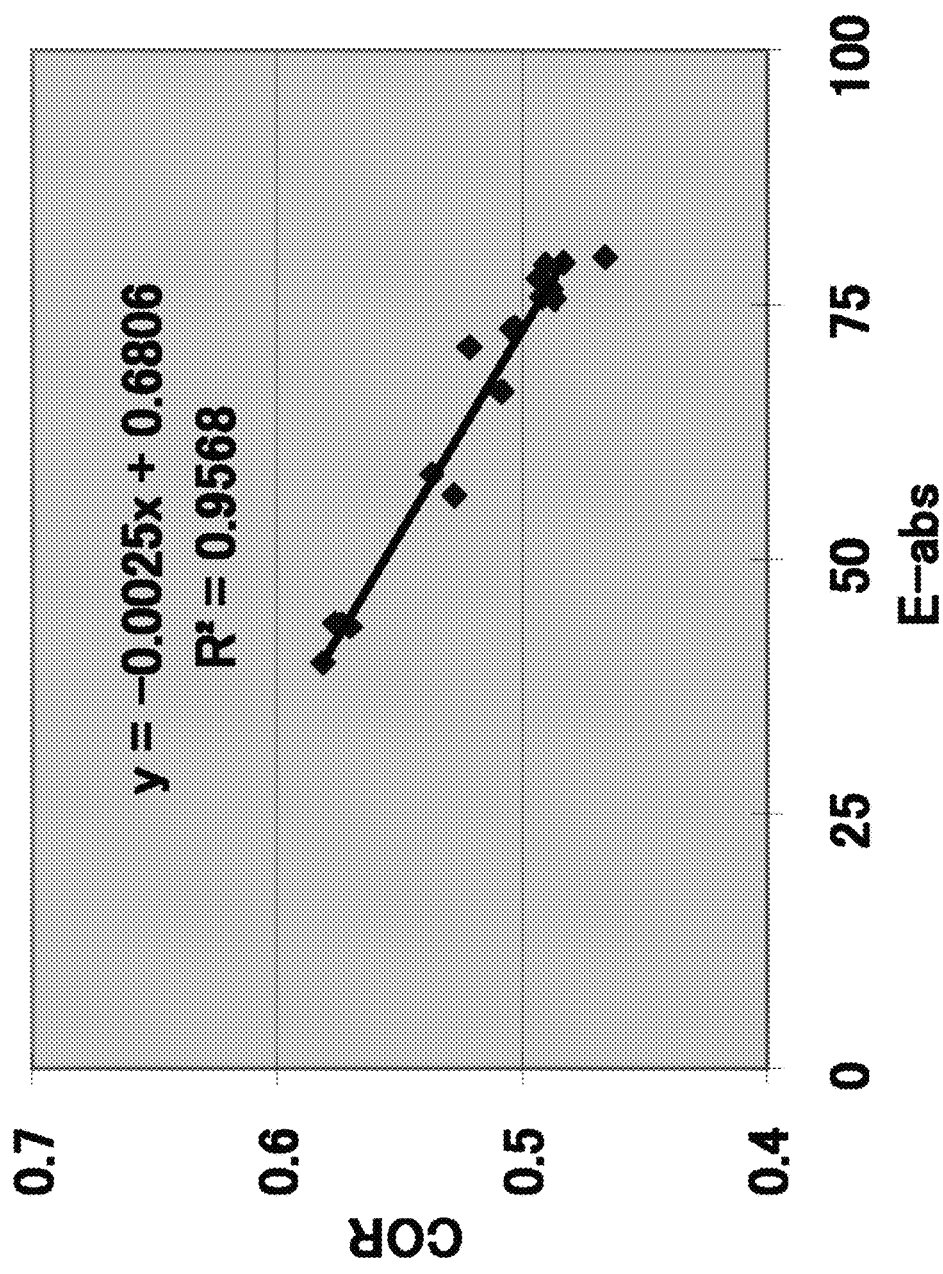
FIG. 4 is a graph comparing coefficient of restitution with energy absorption coefficient, in accordance with some embodiments of the present invention.

Table 3, left, shows various empirical data points based on a wide variety of sleeve and bat configurations. Using this data, FIG. 4 plots COR vs. E-abs. As expected, the COR decreases as E-abs increases. In other words, as the bat absorbs more energy, the ball rebounds at a lower speed.

This tuneability enables the bat to be adjusted to meet the rules and regulations for a variety of sanctioning bodies.

Figure 5:
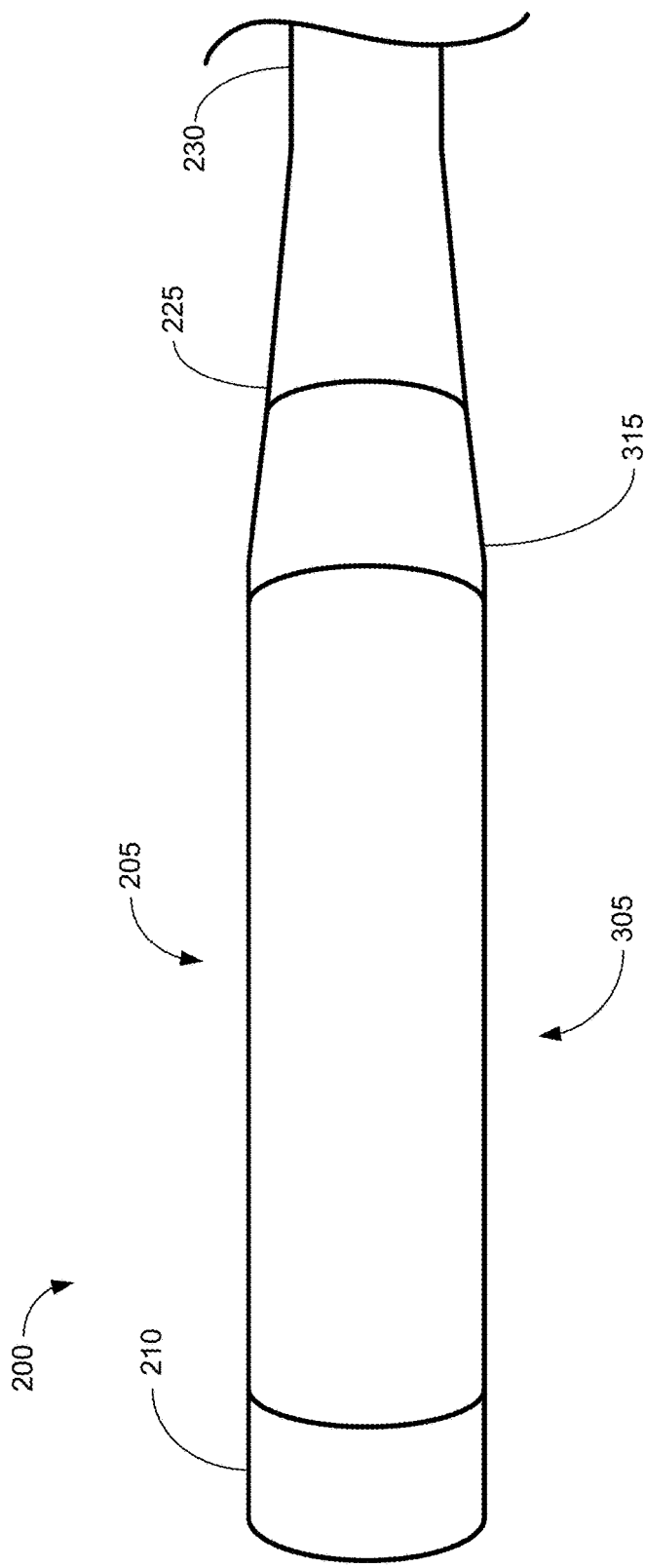
FIG. 5 depicts a two-piece sleeve assembled on a bat core, in accordance with some embodiments of the present invention.

As shown in FIG. 5, the assembled bat system 200 provided a rigid core 205 partially clad in a sleeve assembly 305. The sleeve assembly 305 provides a smooth transition between the tip portion 210 of the core 205. The smooth transition enables clean hits even when the location of contact overlaps the core 205 and the sleeve assembly 305. In this configuration, the assembled system 200 offers a bat with a substantially conventional profile, while providing the tuneability necessary to meet a variety of regulations.

Figure 6A:
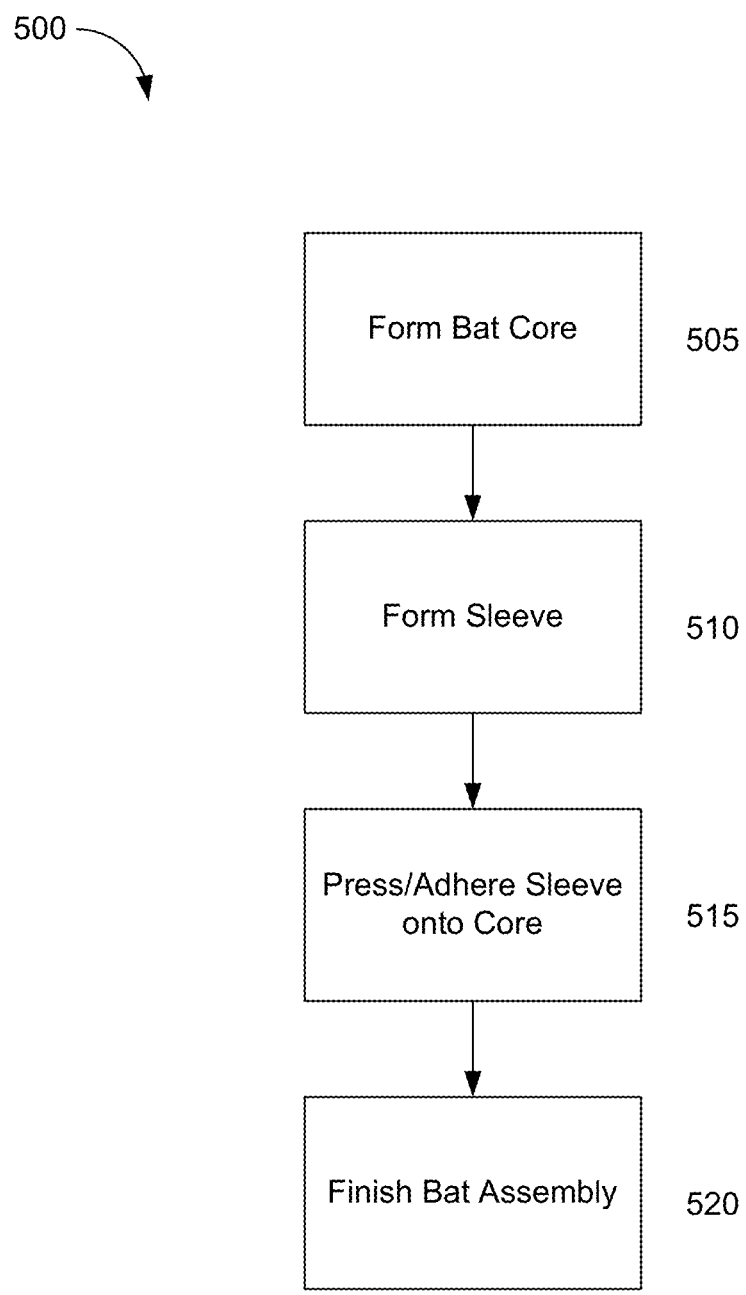
FIG. 6a is a flowchart for a method of pressing a sleeve onto a bat, in accordance with some embodiments of the present invention.

As shown in FIG. 6a, embodiments of the present invention can also comprise a method 500 for manufacturing a bat with an exterior sleeve. In some embodiments, a tube of a suitable material such as, for example and not limitation, aluminum, carbon fiber, Kevlar®, fiberglass, or combinations thereof can be molded 505 to form a bat core. In a preferred embodiment, the core can comprise aluminum and can be, for example, blow molded, forged, or swaged to form the core.

In some embodiments, the method 500 can further comprise forming 510 the sleeve assembly out of, for example and not limitation, carbon fiber, Kevlar®, or fiberglass. Depending on the material, the sleeve, and/or cone can be formed 510 using a suitable method including, but not limited to, injection molding, blow molding, or vacuum molding. In some embodiments, the sleeve assembly can comprise TPU, PU, or a combination thereof. The sleeve and cone can be injection molded 510, for example, for reduced cost with good finish quality. In other embodiments, the sleeve assembly can be molded 510 in a single part. After forming 510, the sleeve and/or cone can be press fit or adhered 515 to the core. In some embodiments, the bat assembly can be finished 520 (e.g., turned on lathe or sanded) for improved fit and finish, as well as final sizing of the bat assembly.

As shown in FIG. 6b, embodiments of the present invention can further comprise a method of manufacturing a bat 600 comprising partially molding the sleeve in place. As before, a tube of a suitable material such as, for example and not limitation, aluminum, carbon fiber, Kevlar®, fiberglass, or combinations thereof can be molded 605 to form a bat core. In a preferred embodiment, the core can again comprise aluminum and can be, for example, blow molded, forged, or swaged to form the core.

The method 600 can further comprise forming 610 the sleeve assembly out of, for example and not limitation, carbon fiber, Kevlar®, or fiberglass. Depending on the material, the sleeve, and/or cone can be formed 610 using a suitable method including, but not limited to, injection molding, blow molding, or vacuum molding. In a preferred embodiment, an outer sleeve and/or cone can be injection molded from TPU. The outer sleeve can be molded such that the inner diameter of the outer sleeve is larger than the outer diameter of the bat barrel. The outer sleeve can then be placed into a sleeve mold 615 that is substantially the same shape as the outer sleeve.

The sleeve mold can then be positioned over the core 620 such that the outer sleeve is concentrically located about the core and such that a first end of the outer sleeve is aligned with the barrel taper (or step). In this manner, the outer sleeve is properly located on and about the bat, but a concentric space exists between the outer sleeve and the barrel. Material can then be injection molded 625 into the space between the outer sleeve and the core. This provides an inner sleeve and affixes the outer sleeve to the barrel. In a preferred embodiment, the inner sleeve can comprise PU.

The sleeve mold can then be removed 630 and final finishing can be performed (e.g., to remove extra material, smooth edges, etc.)

Figure 7A:
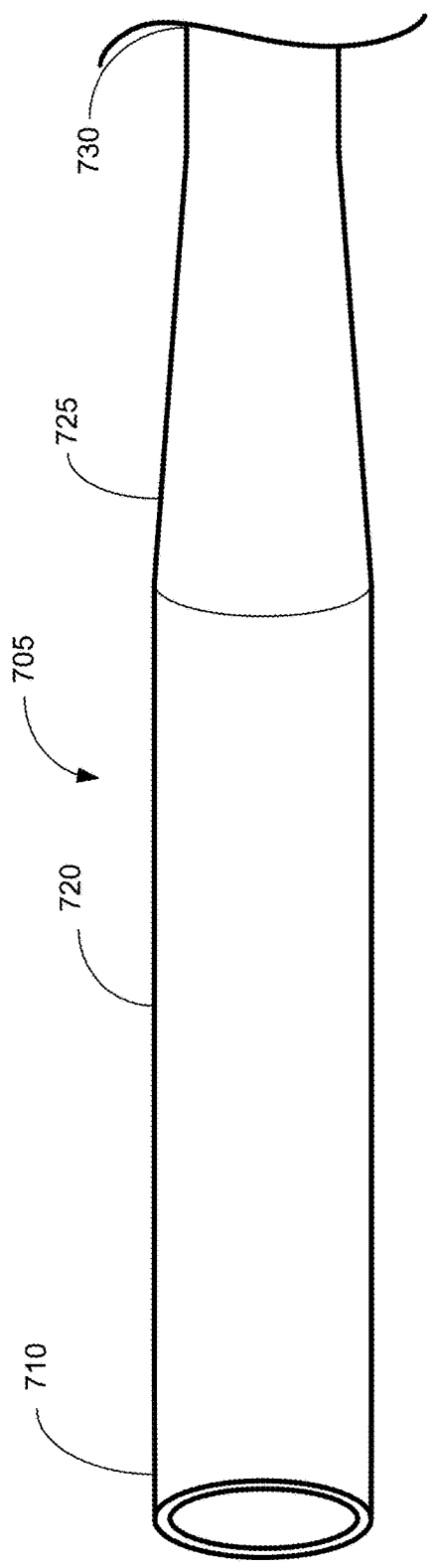
FIG. 7a depicts a hybrid bat body with no flanges, in accordance with some embodiments of the present invention.

As mentioned above, flanges on the bat barrel increase manufacturing costs, decrease serviceability, and can produce weak spots in the bat. To this end, in some embodiments, as shown in FIG. 7a, embodiments of the present invention can comprise a bat with no steps or flanges. In some embodiments, therefore, the bat 700 can comprise a rigid core 705 with a handle taper 725 and a handle 730. In this configuration, however, a barrel portion 720 and tip portion 710 of the bat 700 can be substantially the same diameter, without a step, or shoulder, as in previous embodiments.

In some embodiments, the barrel of the bat can be stepless. In other words, while the barrel may be tapered toward the tip, tapered toward the handle, or cylindrical, it does not contain any abrupt changes in profile (i.e., the profile is preferably continuous rather than discontinuous in the mathematical sense). The lack of a step or shoulder can improve the strength of the bat by preventing sharp corners, for example, that result in stress risers. In addition, the stepless design can enable the core bat 700 to be more easily manufactured (e.g., extruded) without requiring additional forming steps. The stepless design can also provide a more consistent hitting feel along the length of the barrel 720 due to the more consistent profile.

Figure 7B:
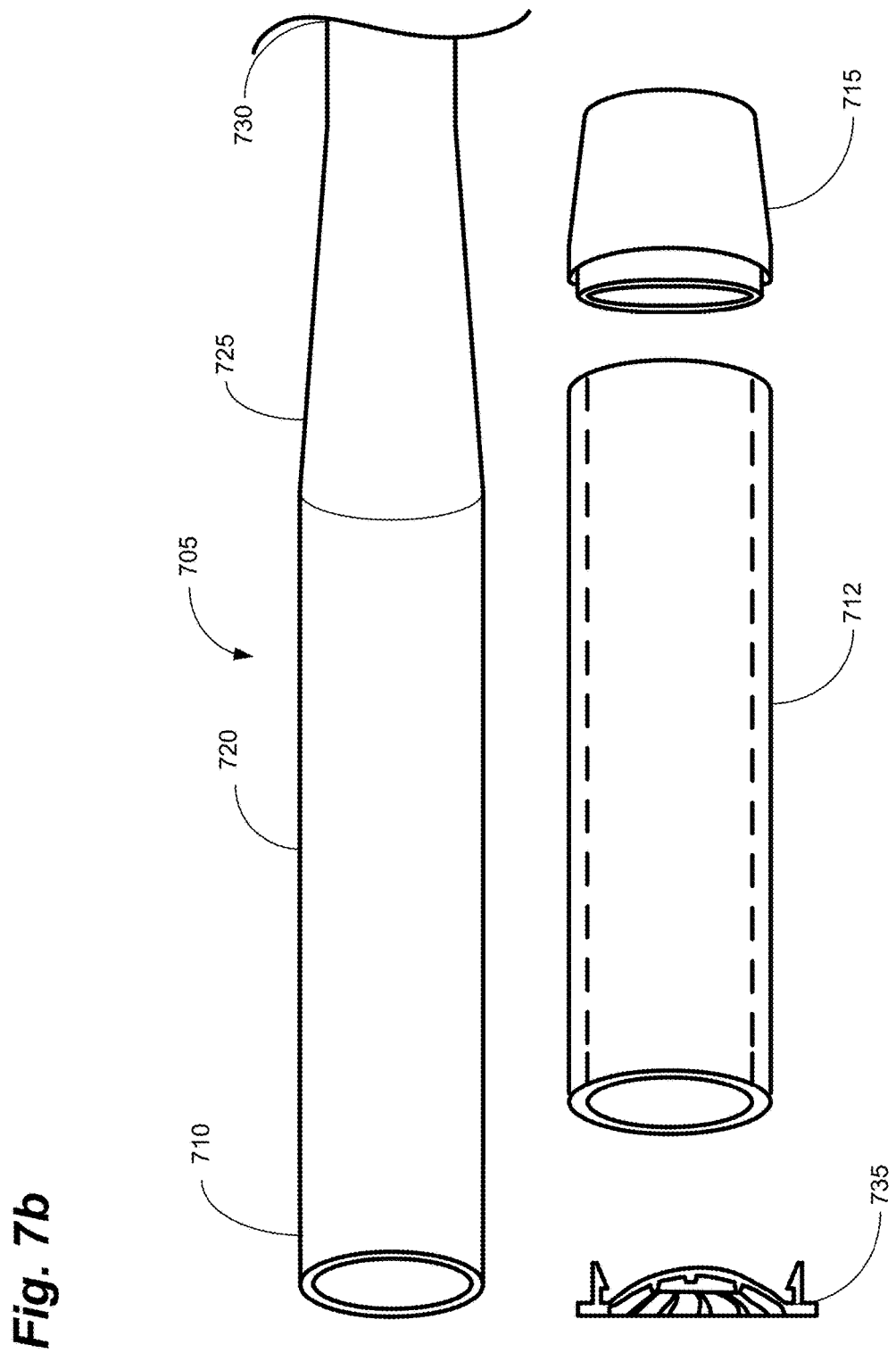
FIG. 7b depicts the hybrid bat body of FIG. 7a with a two-piece sleeve and cap, in accordance with some embodiments of the present invention.
Figure 7D:
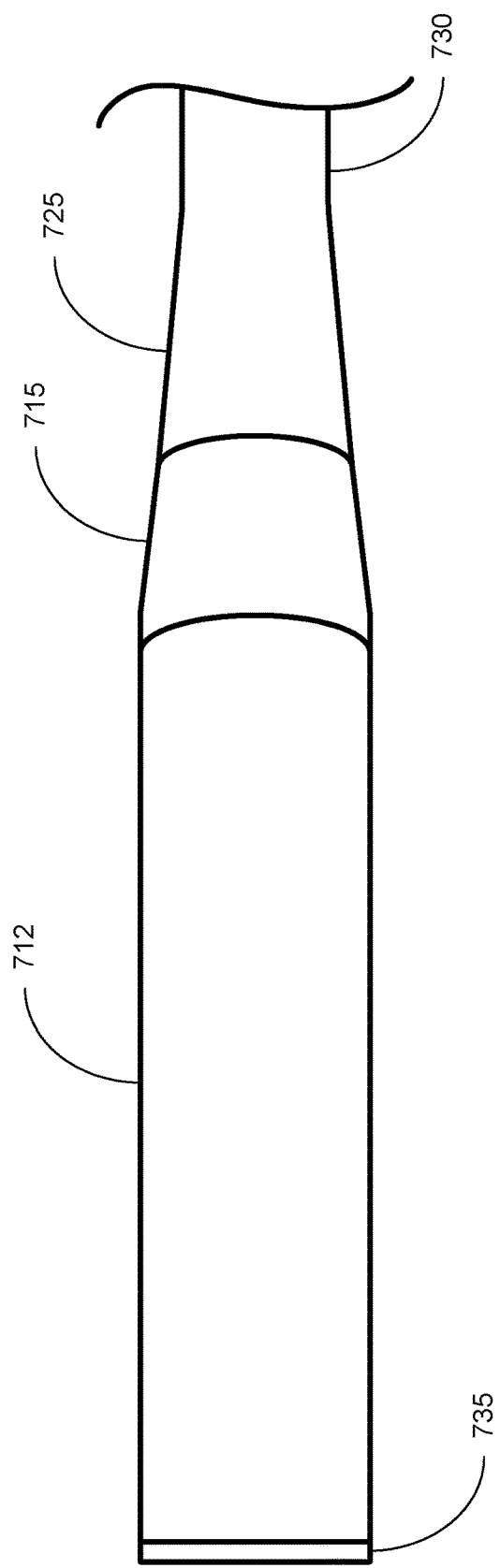
FIG. 7d depicts an exterior view of the assembled hybrid bat body with a two-piece sleeve and cap of FIG. 7b, in accordance with some embodiments of the present invention.

As shown in FIG. 7b-7d, in some embodiments, the bat 700 can further comprise a cap 735, a sleeve 712, and a cone 715. In this manner, the sleeve 712 can be positioned over the barrel 720 from either end. In some embodiments, the cap 735 can be placed on the bat 700 proximate the first portion 710 of the barrel 720 and can locate the sleeve 712 on the barrel 720. In other words, the cap 735 can locate the sleeve 712 such that it is substantially aligned with the end of the barrel 720, such that the sleeve 712 is concentric with the barrel 720, or both.

In some embodiments, the sleeve 712 and cone 715 can be press-fit on the barrel 720. In other embodiments, the sleeve 712 and cone 715 can be adhered to the barrel 720 using, for example and not limitation, epoxy, glue sheets, or heat shrinking.

In still other embodiments, the sleeve 712 can be placed over the barrel 720 and an internal sleeve material 740 can be injected between the sleeve 712 and the barrel 720. The material 740 can be, for example and not limitation, glue, resin, or rubber. In a preferred embodiment, the material 740 is polyurethane. After injection, the inner sleeve material 740 can cool and solidify substantially affixing the sleeve 712 to the barrel 720. In some embodiments, the cap 735 can be used as a "stop" to prevent material from extruding out the end of the bat 700. In other embodiments, the cap 735 can be inserted after the inner sleeve 740 has cooled to prevent debris from entering the bat 700. In still other embodiments, the cap 735 can be inserted into the sleeve material 740 while it is still in liquid form affixing the cap 735 to the bat 700. This can prevent tampering, for example, by the end user.

In some embodiments, the inner sleeve 740 can be sued to "tune" the bat 700. In other words, a softer material for the inner sleeve 740 can provide dampening, reducing vibration and slightly detune the BBCOR of the bat 700. In other embodiments, the inner sleeve 740 can comprise a material with a relatively high coefficient of restitution, resulting in a "hotter" bat. The inner sleeve 740 can be used, for example, to meet various sanctioning body (e.g., NCAA) BBCOR requirements.

Examples

In some embodiments, the use of a resilient inner sleeve 740 can support the outer sleeve 712 enabling it to be thinner. In some embodiments, for example, the outer sleeve 712 can comprise a tube of TPU that is between approximately 0.2 mm and 1.0 mm, while the inner sleeve 740 can comprise a layer of PU with a thickness of between approximately 6 mm and 10 mm. In a particular embodiment, the outer sleeve 712 can be approximately 0.3 mm and the inner sleeve 740 can be approximately 8 mm.

In some embodiments, the thickness of the barrel 720 can also be varied. In some embodiments, as shown in Table 4, below, for example, the thickness of the barrel 720 can be varied to provide a consistent hitting feel. In some embodiments, the BBCOR of the bat 700 can be larger towards the tip (i.e., near the cap 735) and smaller towards the handle 730. In other embodiments, the BBCOR can be smaller towards the tip (i.e., near the cap 735) and larger towards the handle 730. In other words, the bat 700 can be tuned to meet the needs of individual users or to reduce the differential between balls that are hit in the sweet spot and those that are not.

tric with the bat core, as discussed below. In some embodiments, the sleeve mold can reinforce the outer sleeve to enable the inner sleeve material to be injected under pressure. This can prevent the outer sleeve from deforming during manufacture and can prevent splitting or other damage to the outer sleeve.

In some embodiments, the sleeve mold can be placed over the bat core 820. The sleeve mold can be positioned such that it is centered over (i.e., concentric with) the bat barrel. In some embodiments, the sleeve mold can include temporary or permanent stand-offs to ensure proper spacing. In other embodiments, the sleeve mold and bat core can be inserted into a jig that secures these components in proper orientation.

In some embodiments, once the mold and core are in place, material can be injected in between the TPU outer shell and the bat core 825. This can enable the outer shell to be resiliently adhered to the bat core. In addition, as mentioned above, the injected material can be varied to vary the BBCOR and other characteristics of the bat. In some embodiments, the injected material can be polyurethane. In other embodiments, the injected material can be, for

TABLE 4

Barrel Thickness

| Distance from end of bat (in) | Distance from end of bat (mm) | Outer Diameter (mm) | MC2 T1 Thickness (mm) | MC2 T2 Thickness (mm) | MC2 T3 Thickness (mm) |
|---|---|---|---|---|---|
| 1 | 25.4 | 50 | 2.6 | 2.4 | 2.2 |
| 2 | 50.8 | 50 | 2.6 | 2.4 | 2.2 |
| 3 | 76.2 | 50 | 2.6 | 2.4 | 2.2 |
| 4 | 101.6 | 50 | 2.7 | 2.6 | 2.5 |
| 5 | 127 | 50 | 2.8 | 2.8 | 2.8 |
| 6 | 152.4 | 50 | 2.8 | 2.8 | 2.8 |
| 7 | 177.8 | 50 | 2.8 | 2.8 | 2.8 |
| 8 | 203.2 | 50 | 2.7 | 2.7 | 2.7 |
| 9 | 228.6 | 50 | 2.6 | 2.6 | 2.6 |
| 10 | 254 | 50 | 2.5 | 2.5 | 2.5 |

Figure 8:
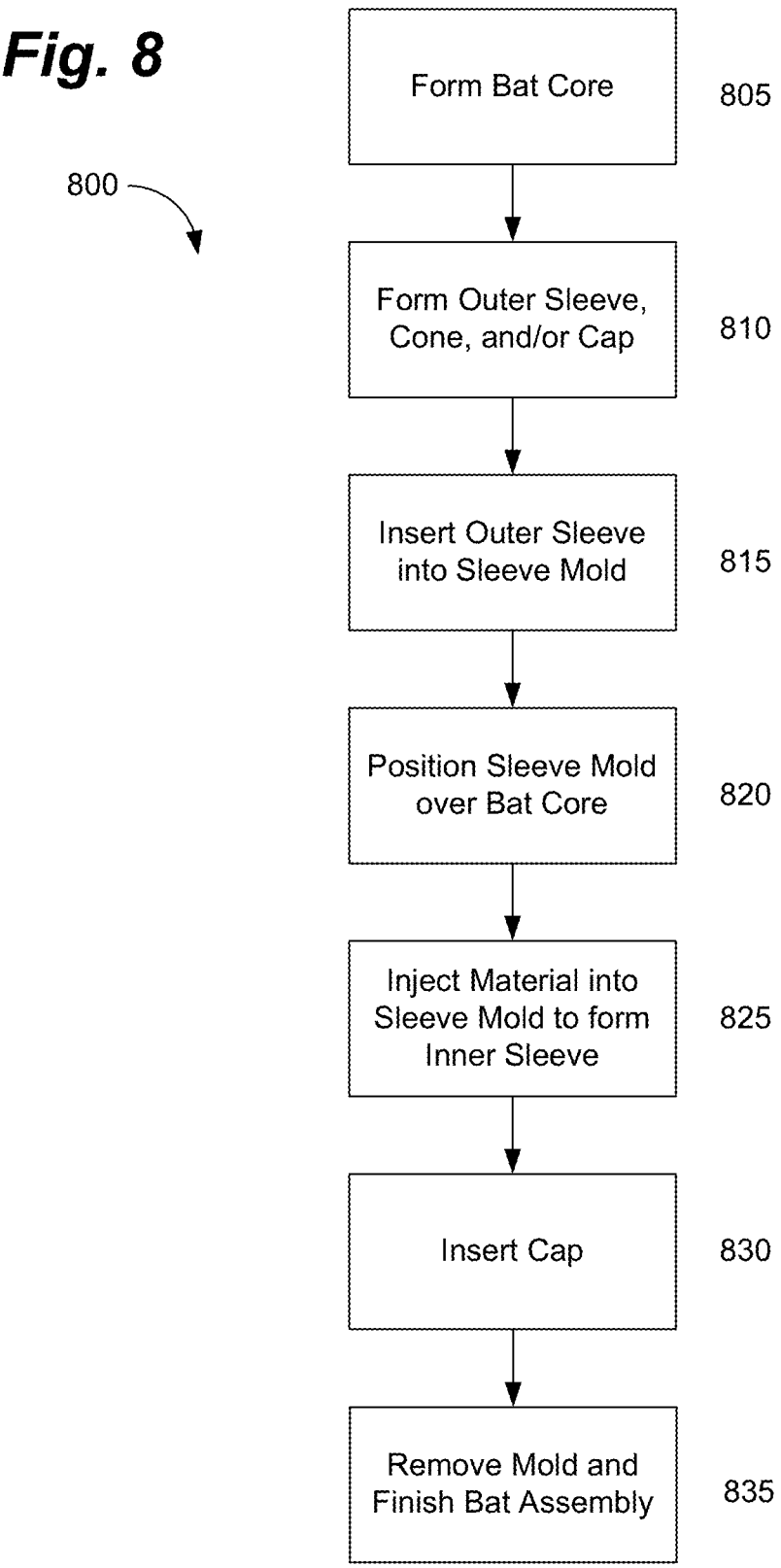
FIG. 8 is a flowchart for a method of molding a two-piece composite sleeve and cap onto a bat with no flanges, in accordance with some embodiments of the present invention.

Embodiments of the present invention can also comprise a method for manufacturing a composite bat with a stepless barrel. As shown in FIG. 8, in some embodiments, the process can include forming the bat core 805. In some embodiments, the bat core can comprise a metal such as, for example and not limitation, aluminum. The bat core can be formed 805 by conventional means such as, for example, forging or extrusion. Because of the stepless design, the core is more easily extruded (i.e., no steps in extrusion process are required) and can also be more easily forged (the stepless design facilitates forging and removal from the dies).

The process can also include forming the outer sleeve, cone, and cap 810. In some embodiments, the sleeve, cone, and cap can be formed from TPU. The stepless design of the barrel enables a corresponding stepless design for the inner surface of the sleeve. In this manner, the sleeve can be easily cast or extruded from TPU, or other similar materials. In other embodiments, the sleeve, cone, and cap can be formed from other materials such as, for example, carbon fiber, fiber glass, or other composite materials. The stepless design can enable the sleeve to be laid up or molded from these materials using simple mandrels. This reduces manufacturing costs and reduces waste at least by making the various parts easier to remove from the forming mandrels.

In some embodiments, the outer sleeve can be placed into a sleeve mold 815. The sleeve mold can hold the sleeve securely and such that it is ultimately substantially concenexample and not limitation, polyester resin, synthetic or natural rubber, or other polymers.

In come embodiments, the cap and cone can be placed on the tip and taper portion of the bat, respectively, 830. In some embodiments, the cap can comprise a locator (e.g., tabs or ridges) to properly locate the cap in the end of the bat. In some embodiments, the cap can be used to properly locate the bat core and outer shell. In this configuration, the cap can be inserted prior to inject of the inner sleeve material 825. In other embodiments, the cap can be inserted after injection 825 and can seal the end of the bat.

The cone can also be placed over the handle taper portion of the bat to seal the taper portion of the bat. In some embodiments, the cap, the cone, or both can be inserted in the bat before the injected material dries/cools/hardens. In this manner, the cap and cone can substantially seal the ends of the outer sleeve and core. In other embodiments, the cap and/or cone can be affixed to the bat using, for example and not limitation, glue, epoxy, rivets, or screws.

The bat can then be removed from the mold and completed 835. In some embodiments, this can include final sanding and finishing. In some embodiments, the bat can be painted and/or stickers or decals installed. If preferred, the handle can be wrapped with an appropriate wrap for improved comfort and grip. In some embodiments, the cap and/or cone can be assembled after the bat has been removed from the mold. Of course, bat assembly could include more or less steps or could be performed in a different order based on, among other things that materials chosen. In some embodiments, for example, the end cap can be inserted into the bat prior to the injection of PU and, as such, can act as a "stopper" to ensure the correct file for the inner sleeve. In some embodiments, the PU can also act as an adhesive for the end cap substantially preventing tapering with the barrel of the bat.

While several possible embodiments are disclosed above, embodiments of the present invention are not so limited. For instance, while several possible configurations have been disclosed (e.g., an aluminum bat with a TPU sleeve), other suitable materials and configurations could be selected without departing from the spirit of embodiments of the invention. In addition, the location and configuration used for various features of embodiments of the present invention can be varied according to a particular bat size and weight, a particular set of rules, or simply user preference. Such changes are intended to be embraced within the scope of the invention.

The specific configurations, choice of materials, and the size and shape of various elements can be varied according to particular design specifications or constraints requiring a device, system, or method constructed according to the principles of the invention. Such changes are intended to be embraced within the scope of the invention. The presently disclosed embodiments, therefore, are considered in all respects to be illustrative and not restrictive. The scope of the invention is indicated by the appended claims, rather than the foregoing description, and all changes that come within the meaning and range of equivalents thereof are intended to be embraced therein.

The invention claimed is:

1. A batting system for baseball or softball, the batting system comprising:
    a substantially stepless, rigid shell comprising a tip portion, a barrel portion, a handle taper, and a handle portion, the barrel portion and the handle portion being substantially cylindrical in shape, the handle taper connecting the barrel portion and the handle portion;
    wherein the substantially stepless, rigid shell maintains a cross-sectional diameter that increases or remains constant when moving in a direction from the handle portion towards the tip portion;
    an exterior sleeve disposed in an overlying manner to the barrel portion, wherein the exterior sleeve comprises a self-supporting, substantially cylindrical sleeve portion disposed proximate the barrel portion that abuts a discrete conical portion disposed proximate the handle taper;
    an interior sleeve disposed between the rigid shell and the exterior sleeve, the interior sleeve having a length and adhering to the rigid shell and the exterior sleeve along the length of the interior sleeve; and
    a cap directly abutting the tip portion,
    wherein the interior sleeve directly abuts both the rigid shell and the exterior sleeve,
    wherein, in a region proximate the cap, both the substantially stepless, rigid shell and the exterior sleeve are substantially parallel to a central axis of the batting system, and
    wherein the interior sleeve and the exterior sleeve each directly abut both the conical portion and the cap.

2. The batting system of claim 1, wherein the thickness of the rigid shell increases from a first end proximate the tip portion to a second end proximate the conical portion.

3. The batting system of claim 1, wherein the thickness of the rigid shell decreases from a first end proximate the tip portion to a second end proximate the conical portion.

4. The batting system of claim 1, wherein the inner sleeve comprises an injectable material injected between the rigid shell and the exterior sleeve.

5. The batting system of claim 1, wherein the exterior sleeve is press fit onto the barrel portion.

6. The batting system of claim 1, wherein:
    the exterior sleeve comprises thermoplastic polyurethane ("TPU"); and
    the interior sleeve comprises polyurethane ("PU").

7. The batting system of claim 6, wherein:
    the thickness of the exterior sleeve is between approximately 0.2 mm and 1.0 mm; and
    the thickness of the interior sleeve is between approximately 6 mm and 10 mm.

8. The batting system of claim 7, wherein:
    the thickness of the exterior sleeve is approximately 0.3 mm; and
    the thickness of the interior sleeve is approximately 8 mm.

9. The batting system of claim 1, wherein the substantially rigid shell comprises an aluminum alloy.

10. The batting system of claim 1, wherein the cap comprises a ridge, the ridge configured to abut and lock into at least one of the rigid shell, the interior sleeve, and the exterior sleeve, and
    wherein the ridge is at least partially molded into the interior sleeve.

11. The batting system of claim 4, wherein the cap is configured to substantially seal the exterior sleeve proximate the tip portion such that the injectable material is substantially retained between the rigid shell and the exterior sleeve.

12. The batting system of claim 1, wherein the interior sleeve adheres the cap and the conical portion to the rigid shell.

13. A batting system for baseball or softball, the batting system comprising:
    a rigid shell comprising a tip portion, a barrel portion, a handle taper, and a handle portion, the barrel portion and the handle portion being substantially cylindrical in shape, the handle taper connecting the barrel portion and the handle portion;
    wherein the rigid shell is substantially stepless and maintains a cross-sectional diameter that increases or remains constant when moving in a direction from the handle portion towards the tip portion;
    a conical portion disposed proximate the handle taper, the conical portion being a discrete part;
    an exterior sleeve disposed in an overlying manner to the barrel portion;
    an interior sleeve disposed between the rigid shell and the exterior sleeve, the interior sleeve being adjacent to both the rigid shell and the exterior sleeve, having a length, and adhering to the rigid shell and the exterior sleeve along the length of the interior sleeve; and
    a cap disposed proximate the tip portion, the cap adhered to one or more of the rigid core, the interior sleeve, and the exterior sleeve,
    wherein the exterior sleeve is substantially parallel to the rigid shell, and
    wherein the interior sleeve and the exterior sleeve are each adjacent to both the cap and the conical portion.

14. The batting system of claim 13, wherein an adhesive adheres one or more of:
    the conical portion to the rigid shell;
    the interior sleeve to the rigid shell;

the exterior sleeve to the conical portion;
the exterior sleeve to the interior sleeve;
the cap to the rigid shell;
the cap to the interior sleeve; and
the cap to the exterior sleeve.

15. The batting system of claim 14, wherein the adhesive comprises a glue.

16. The batting system of claim 14, wherein the adhesive comprises an epoxy.

17. The batting system of claim 13, wherein the cap comprises a ridge, the ridge being adjacent to at least one of the rigid shell, the interior sleeve, and the exterior sleeve.

18. The batting system of claim 17, wherein the ridge is at least partially molded into the interior sleeve.

19. The batting system of claim 13, wherein the inner sleeve comprises an injectable material injected between the rigid shell and the exterior sleeve.

20. The batting system of claim 19, wherein the cap is configured to substantially seal the exterior sleeve proximate the tip portion such that the injectable material is substantially retained between the rigid shell and the exterior sleeve.

* * * * *